A. GOODHART.
Straw Cutter.
No. 67,975. Patented Aug. 20, 1867.
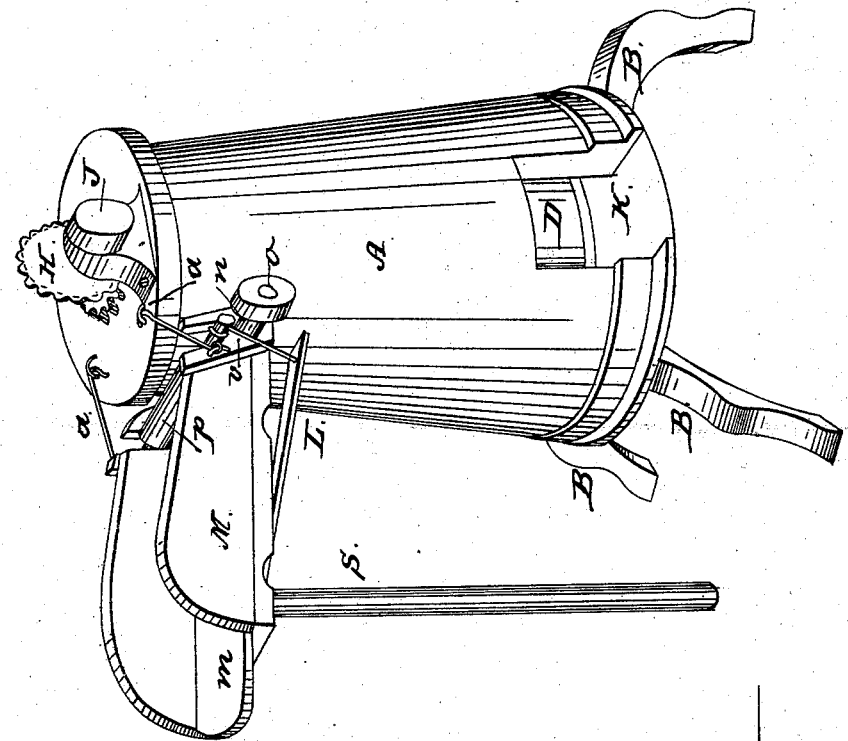
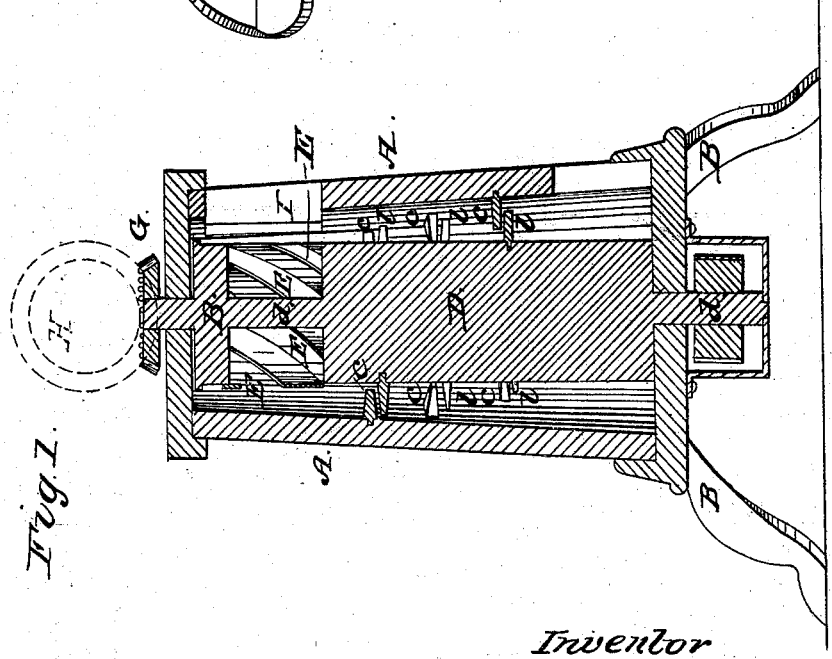
Witnesses
Chas. A. Pettit
J. C. Kenon
Inventor
Alex Goodhart
By Munn & Co.
his Attorneys

United States Patent Office.

ALEXANDER GOODHART, OF NEWVILLE, PENNSYLVANIA.

Letters Patent No. 67,975, dated August 20, 1867.

IMPROVEMENT IN MACHINE FOR CUTTING AND GRINDING CORN FODDER.

*The Schedule referred to in these Letters Patent and making part of the same.*

TO ALL WHOM IT MAY CONCERN:

Be it known that I, ALEXANDER GOODHART, of Newville Post Office, in the county of Cumberland, and State of Pennsylvania, have invented a new and improved Mill for Cutting and Grinding Corn Fodder; and I do hereby declare the following to be a full, clear, and exact description of the same, reference being had to the accompanying drawings, forming part of this specification, and in which—

Figure 1 is a vertical sectional elevation through the centre of my machine, the feeding apparatus being removed.

Figure 2 is a perspective view of my machine showing the feeding apparatus and the discharging port.

Similar letters of reference indicate corresponding parts in the two figures.

A A represent the walls of a hollow cylinder, in shape the frustum of a cone, resting upon the supports B B B, and having stout teeth, $c\ c\ c\ c$, projecting inward from its interior surface. D D represent a drum enclosed within the walls A A, of a shape corresponding to that of the chamber of the cylinder A A, supported by and revolving upon the upright shaft $d\ d$, and having teeth, $t\ t\ t\ t$, projecting outward to match the teeth of the walls A A. The teeth of the cylinder and drum are of the same length, and overlap each other so as to grind whatever substance may be forced between them. The upper part of the drum D D is cut away, and in its place are seen the cutters E E, firmly attached to the drum above and below by their extremities so that they revolve directly in front of the feed-hole F. The upper end of the shaft $d\ d$ is provided with a cog-wheel, G, which gears into another wheel, H, upon a shaft to which the power is applied at the drum J. K is the discharge-port. M is the feeding apparatus, composed of the inclined table $m$, the corrugated or fluted roller $n$, to which power is applied at the drum $o$, the smooth roller $p$ held in position and regulated by the rods U U attached to the springs T T. S is a leg, which serves to support the table $m$. The whole feeding apparatus is attached to the cylinder A A at the feed-hole F by tenons projecting from the table $m$ and resting on the cylinder at the bottom of the aperture F, and still further by means of the rods $u\ u$, of which one end is attached to the table $m$, and the other hooks into an eye on the cylinder.

When the construction of my machine is thus described a few words will suffice to explain its operation: The machine is set in motion by power applied at the drum J, and communicated to the drum $o$ by a band. The fodder is fed to the rollers $n$ and $p$ from the table $m$, and by them is forced into the cylinder A through feed-hole F, and against the revolving cutters E E by which it is cut into fine pieces. It then falls among the teeth of the drum and cylinder, and is ground, after which it escapes through the discharge-port K.

Having thus described my invention, what I claim as new, and desire to secure by Letters Patent, is—

The combination and arrangement of the cutters E E and teeth $l\ l\ l$ upon the vertical drum D working in an upright cylinder, A, provided with teeth $c\ c$, substantially as and for the purpose specified.

To the above specification of my improvement I have signed my hand this 1st day of April, 1867.

ALEX. GOODHART.

Witnesses:
 CHAS. A. PETTIT,
 S. C. KEMON.